United States Patent Office 2,732,379
Patented Jan. 24, 1956

2,732,379
METHOD OF PREPARING VITAMIN B₆

John S. Webb, Warren Township, Somerset County, N. J., assignor to American Cyanamid Company, New York, N. Y., a corporation of Maine No Drawing. Application July 30, 1953, Serial No. 371,430

6 Claims. (Cl. 260—297.5)

This invention relates to the preparation of vitamin B₆. More particularly, it relates to the preparation of vitamin B₆ from substituted furans by a one-step process.

In the past vitamin B₆ (2-methyl-3-hydroxy-4,5-pyridine dimethanol) has been synthesized by the preparation of variously substituted pyridine compounds and the subsequent conversion of said substituent groups to those present in the vitamin by such processes as reduction, nitration, chlorination, diazotization, aminolysis, hydrolysis, etc. Consequently all of these processes require several steps to convert the originally formed substituted pyridine to vitamin B₆.

I have now found that vitamin B₆ can be prepared from 2-aceto-3,4-furandimethanol, its O-acyl derivatives or ethers in a simplified process by heating said compounds with an ammonium salt in the presence of water. In the case of the ethers a subsequent ether cleavage step is required to give vitamin B₆. The reaction which takes place can be illustrated by the following formula:

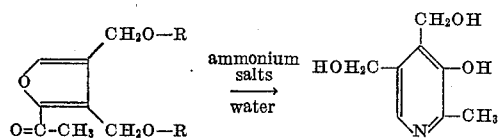

in which R is a hydrogen, acyl, alkyl, aryl or aralkyl radical.

Vitamin B₆ is a member of the B-complex vitamins and is sometimes called pyridoxine or adermine. Its properties and usefulness in the field of vitamin therapy are well known.

In preparing the compounds of the present invention, the preferred starting material is an O-acyl derivative of 2-aceto-3,4-furandimethanol. The compound 2-aceto-3,4-furandimethanol itself, as well as ethers thereof, can also be used as starting material. These are new compounds and are described and claimed in my copending application, Serial Number 371,429, filed July 30, 1953. These intermediates or starting materials can be compounds such as 2-aceto-3,4-bis(acetoxymethyl)furan; 2-aceto - 3,4 - bis(propionoxymethyl)furan; 2-aceto-3,4-bis(butyryloxymethyl)furan; 2 - aceto - 3,4 - bis(formoxymethyl)furan; 2-aceto-3,4-bis(benzoxymethyl)furan; 2-aceto - 3,4 - bis(furoxymethyl)furan; 2 - aceto - 3,4 - bis(phenylacetoxymethyl)furan; 2 - aceto-3,4-bis(methoxymethyl)furan; 2 - aceto - 3,4-bis(ethoxymethyl)furan; 2-aceto - 3,4 - bis(propoxymethyl)furan; 2 - aceto - 3,4-bis(phenoxymethyl)furan; 2 - aceto - 3,4 - bis(benzyloxy)-methylfuran; etc. Also mixed O-acyl derivatives and ethers of 2-aceto-3,4-furandimethanol can be used in the process of the present invention. While 2-aceto-3,4-furandimethanol itself can be used, it is generally desirable to use a diacyl derivative thereof since the intermediate is preferably prepared in this form. It is believed that formation of the pyridine ring takes place followed by hydrolysis of the acyloxy linkage. However, the hydrolysis may occur first followed by formation of the pyridine ring, and applicant does not wish to be bound by any particular order of reaction.

The ammonium salts found most useful in the present process are those of the inorganic acids such as ammonium chloride; ammonium sulfate; ammonium phosphate; ammonium nitrate; and the like. However, other ammonium salts can be used such as the acetate. Best results have been obtained by the use of an ammonium salt along with ammonium hydroxide. However, ammonium hydroxide is not essential in the reaction as shown in the examples hereinafter.

The process of the present invention is preferably carried out at the refluxing temperature of the reaction mixture. The process, however, can be carried out at a temperature of from 50° C. to 175° C. The time necessary to complete the reaction is dependent upon the temperature and intermediates used and will vary from one to thirty-six hours.

The following examples describe the process of the present invention in greater particularity and are intended to be by way of illustration and not limitation.

Example 1

A solution of 37 g. of dimethyl 3,4-furan dicarboxylate (prepared according to the procedure of Alder and Rickert, Ber. 70, 1354) dissolved in 400 ml. of absolute ether is added dropwise during stirring to 15.2 g. of lithium aluminum hydride in 800 ml. of absolute ether over a period of about one hour. The resulting mixture is stirred two hours at room temperature and then 52 ml. of ethyl acetate is added dropwise during rapid stirring. Following this, 125 ml. of water is added dropwise also during rapid stirring. The ether layer is then decanted from the resulting mass of alumina gel and the latter extracted by stirring several minutes each with two 400 ml. portions of ether. The original ether layer and the two extracts are then combined and dried over anhydrous sodium sulfate. Filtration of the drying agent and removal of the ether by distillation on the steam bath leaves a residue of a pale yellow somewhat viscous syrup. This material is vacuum distilled at a pressure of 1 mm. and the fraction boiling at 115°–120° C. collected to give 18.5 g. of 3,4-furandimethanol, a colorless, water soluble syrup with an index of refraction $n_D^{27} = 1.5073$.

3,4-furandimethanol (16 g.), acetic anhydride (50 ml.) and pyridine (0.2 ml.) are heated together on a steam bath for two hours. The resulting mixture is then vacuum distilled at 20 mm. from a steam bath to remove the excess acetic anhydride and the acetic acid formed in the reaction. The residue is then further distilled at a pressure of 0.7 to 0.9 mm. and the material boiling at 104°–106° C. is collected to yield 25.7 g. of 3,4-bis-(acetoxymethyl)furan in the form of a colorless oil which has a refractive index of 1.4668 at 26°. On cooling to a low temperature the oil crystallizes to colorless irregular plates which melt at 30°–30.5° C.

3,4-bis(acetoxymethyl)furan, 2.1 g., is dissolved in acetic anhydride, 1.0 ml. To this is added a mixture of 85% phosphoric acid, 0.2 ml., in acetic anhydride, 1.0 ml. The mixture is warmed to 50° C. for a few minutes then sealed from the air and set aside at room temperature overnight. The reaction mixture is then diluted with water, 20 ml., and agitated until the odor of acetic anhydride disappears. The resulting oil is extracted from the aqueous solution with several portions of ether which are combined, washed with a saturated solution of sodium bicarbonate and finally dried with anhydrous sodium sulfate. After filtration from the drying agents the ether is distilled on the steam bath leaving a residue of yellowish oil. This is vacuum distilled at a pressure of 1 mm. and the colorless oil which boils in the range of 130°–

150° C. is collected. Most of this oil boils in the range of 145°–148° C. at 1 mm. pressure. On cooling and scratching the oil crystallizes. The product is recrystallized from a mixture of ethyl ether-petroleum ether to give pure 2-aceto-3,4-bis(acetoxymethyl)furan in the form of large, irregular white crystals having a melting point of 51°–52° C. It gives a positive iodoform test and forms a p-nitrophenylhydrazone derivative which has a melting point of 208°–210° C.

2-aceto-3,4-bis(acetoxymethyl)furan, 1 g., and ammonium chloride, 20 g., are refluxed together in 30 ml. of water for 30 hours. A clear solution is obtained in 5 to 22 hours and the final reaction mixture is nearly colorless. This is diluted and filtered to yield a solution containing pyridoxine as demonstrated by both chemical and microbiological assay.

*Example 2*

1 g. of 2-aceto-3,4-bis(acetoxymethyl)furan is heated for three hours at 100° C. in a solution prepared from 4 g. of ammonium chloride, and 4 ml. of concentrated ammonium hydroxide plus water to make 25 milliliters. A clear, nearly colorless solution is obtained which contains vitamin $B_6$ as indicated by colorimetric and bioassay.

*Example 3*

2 g. of 2-aceto-3,4-bis(acetoxymethyl)furan, 5 g. of ammonium sulfate and 50 ml. of water are heated together in a sealed tube at 160° for two hours. The resulting light brown solution is then clarified to remove the small amount of insoluble material present to yield a solution containing vitamin $B_6$.

*Example 4*

2-aceto-3,4-furandimethanol, 1 g., and ammonium chloride, 20 g., are refluxed together in 30 ml. of water for six hours. At the end of this time a sample of the clear, nearly colorless reaction mixture is diluted to double volume to yield a solution containing pyridoxine.

I claim:

1. A method of preparing vitamin $B_6$ which comprises heating a compound having the formula:

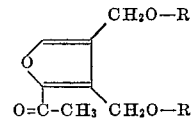

in which R is a member of the group consisting of hydrogen and a lower alkanoic acyl radical, with an ammonium salt of a strong inorganic acid in the presence of water and recovering said product.

2. A method of preparing vitamin $B_6$ which comprises heating a lower alkanoic acyl derivative of 2-aceto-3,4-furandimethanol with an ammonium salt of a strong inorganic acid in the presence of water and recovering said product.

3. A method of preparing vitamin $B_6$ which comprises heating 2-aceto-3,4-furandimethanol with an ammonium salt of a strong inorganic acid in the presence of water and recovering said product.

4. A method of preparing vitamin $B_6$ which comprises heating 2-aceto-3,4-bis(acetoxymethyl)furan with ammonium chloride in the presence of water and recovering said product.

5. A method of preparing vitamin $B_6$ which comprises heating 2-aceto-3,4-bis(acetoxymethyl)furan with ammonium chloride in the presence of aqueous ammonium hydroxide and recovering said product.

6. A method of preparing vitamin $B_6$ which comprises heating 2-aceto-3,4-bis(acetoxymethyl)furan with ammonium sulfate in the presence of water and recovering said product.

No references cited.